United States Patent
Baumann et al.

(10) Patent No.: US 7,029,575 B1
(45) Date of Patent: Apr. 18, 2006

(54) FILTER WITH A VALVE COMBINATION COMPONENT

(75) Inventors: Dieter Baumann, Greven (DE); Wilhelm Ardes, Ascheberg (DE)

(73) Assignee: Hengst GmbH & Co. KG, (DE)

( * ) Notice: Subject to any disclaimer, the term of this patent is extended or adjusted under 35 U.S.C. 154(b) by 39 days.

(21) Appl. No.: 10/070,781

(22) PCT Filed: Sep. 8, 2000

(86) PCT No.: PCT/DE00/03125

§ 371 (c)(1),
(2), (4) Date: Aug. 27, 2002

(87) PCT Pub. No.: WO01/17658

PCT Pub. Date: Mar. 15, 2001

(30) Foreign Application Priority Data

Sep. 9, 1999 (DE) .......................... 299 15 844 U

(51) Int. Cl.
*B01D 27/08* (2006.01)
*B01D 27/10* (2006.01)

(52) U.S. Cl. .................. 210/130; 210/136; 210/430; 210/440

(58) Field of Classification Search ........ 137/512–513; 210/130, 131, 136, 133, 429, 440, 430
See application file for complete search history.

(56) References Cited

U.S. PATENT DOCUMENTS

| 3,268,077 | A | * | 8/1966 | Ball | 210/131 |
| 5,589,060 | A | * | 12/1996 | Gebert et al. | 210/130 |
| 6,068,763 | A | * | 5/2000 | Goddard | 210/130 |

FOREIGN PATENT DOCUMENTS

| DE | 4131353 A1 | 10/1992 |
| DE | 4140140 A1 | 6/1993 |
| DE | 4201041 A1 | 7/1993 |
| DE | 4240656 C2 | 7/1993 |
| DE | 4214500 C2 | 11/1993 |
| DE | 4243217 A1 | 6/1994 |
| DE | 4303694 A1 | 8/1994 |
| DE | 9411212 U1 | 10/1994 |
| DE | 4446263 A1 | 6/1996 |
| DE | 4446263 C2 | 6/1996 |
| DE | 29610290 U1 | 10/1996 |
| DE | 19539918 C1 | 2/1997 |
| DE | 29915844 U1 | 3/2001 |
| EP | 492627 A2 * | 7/1992 |
| EP | 692292 B2 | 1/1996 |
| GB | 2279725 A | 1/1995 |

* cited by examiner

*Primary Examiner*—Terry K. Cecil
(74) *Attorney, Agent, or Firm*—Lahive & Cockfield, LLP

(57) ABSTRACT

The invention relates to a filter, such as an oil filter for a combustion engine. The inventive filter includes a filter housing and a valve, such as a non-return valve, a filter bypassing valve or a drain valve, that is arranged in the filter housing. According to the invention, the valve body of said valve is arranged at a combination component which is provided with a connector for connecting at least one additional filter component, such as an additional valve or a filter inset, to the combination component.

5 Claims, 4 Drawing Sheets

Figure 1B:
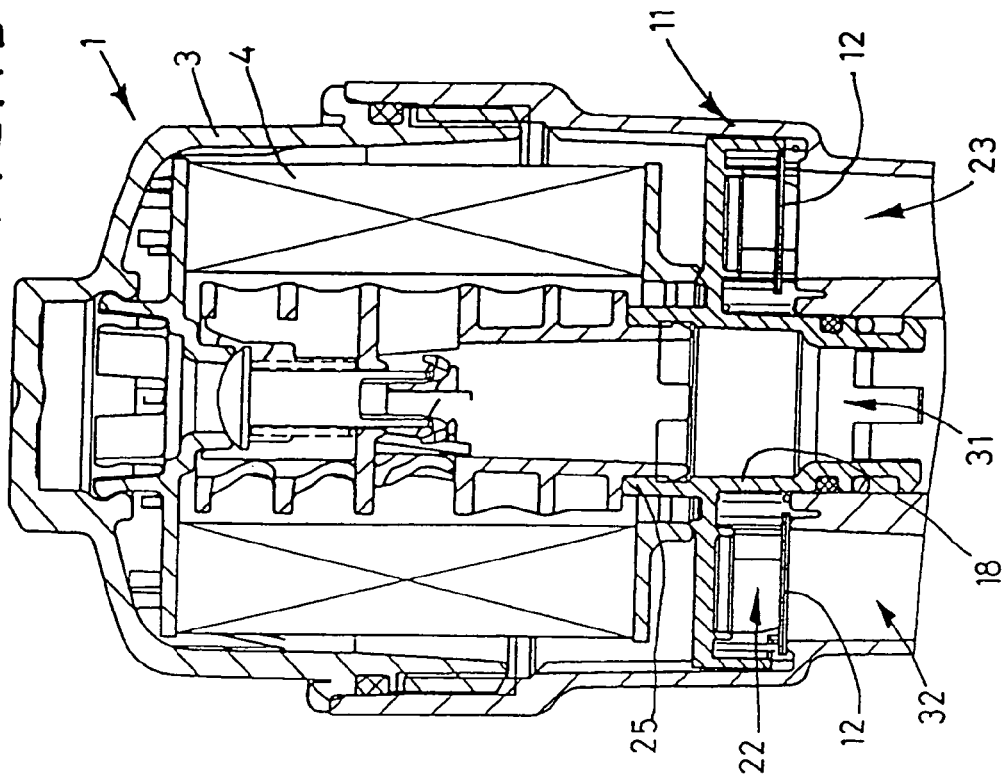

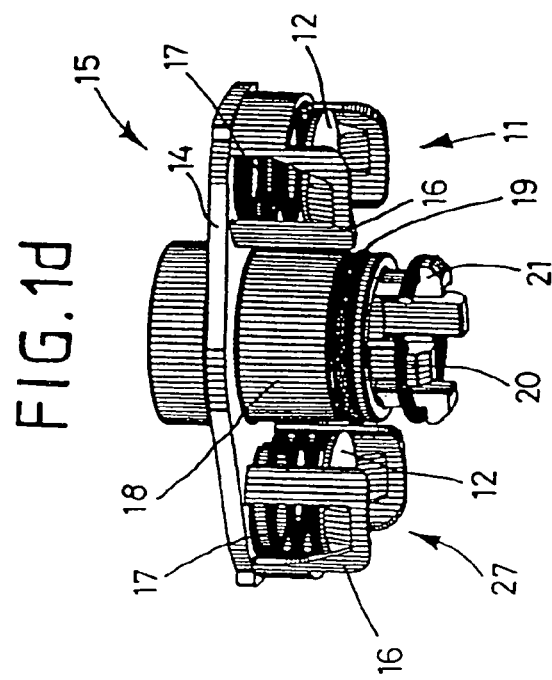
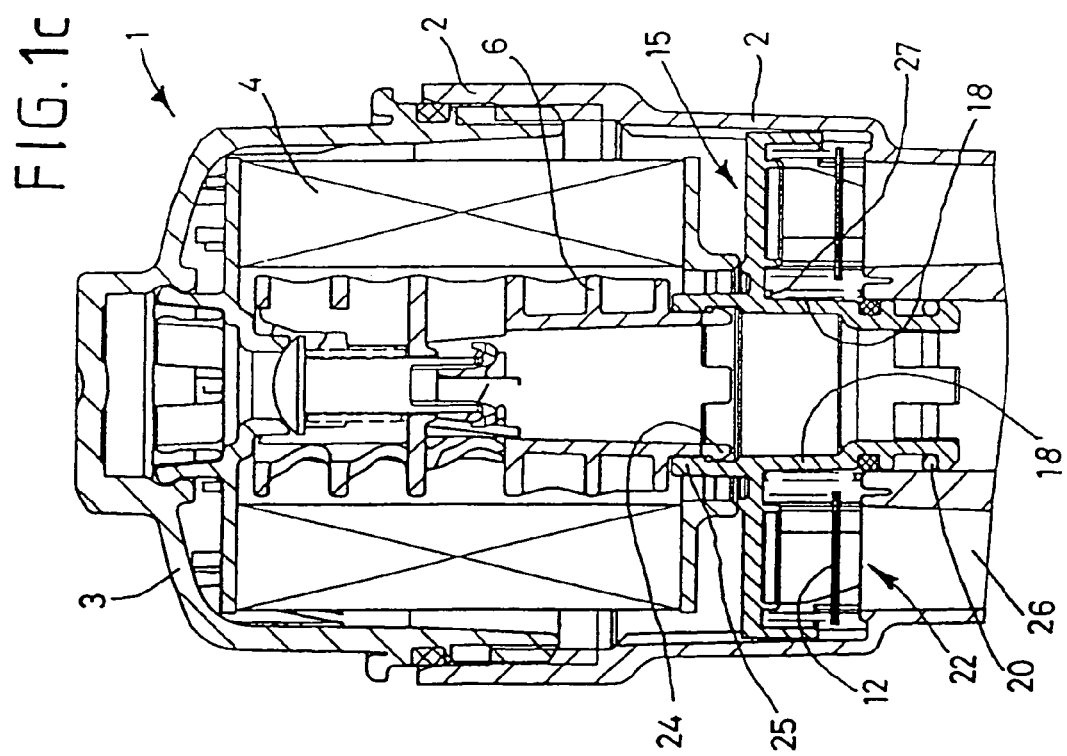

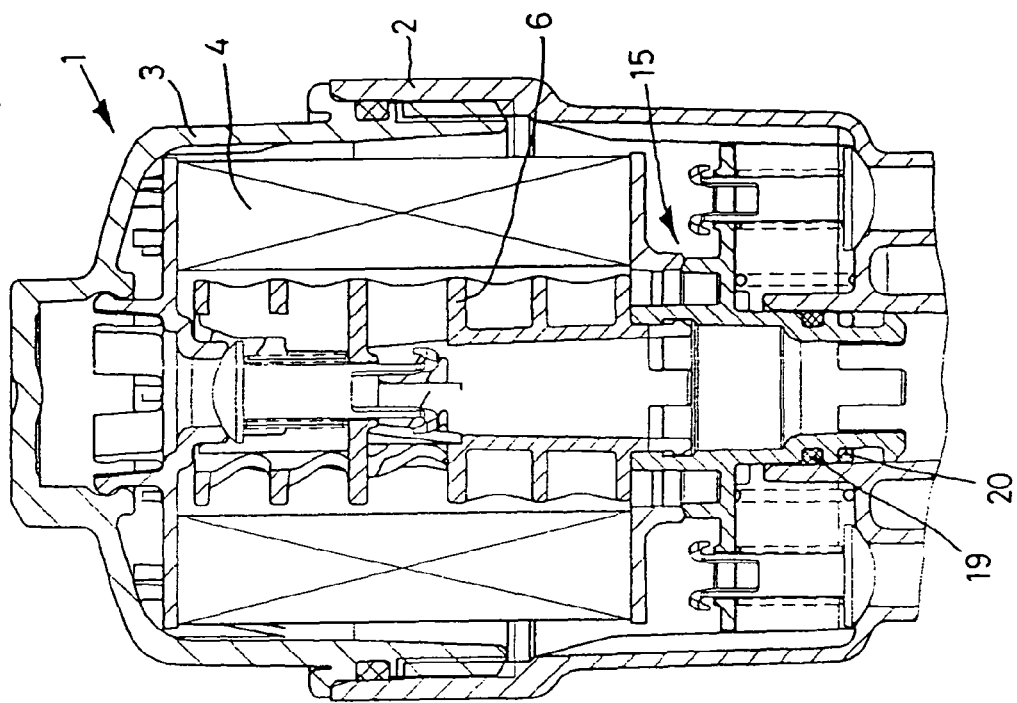
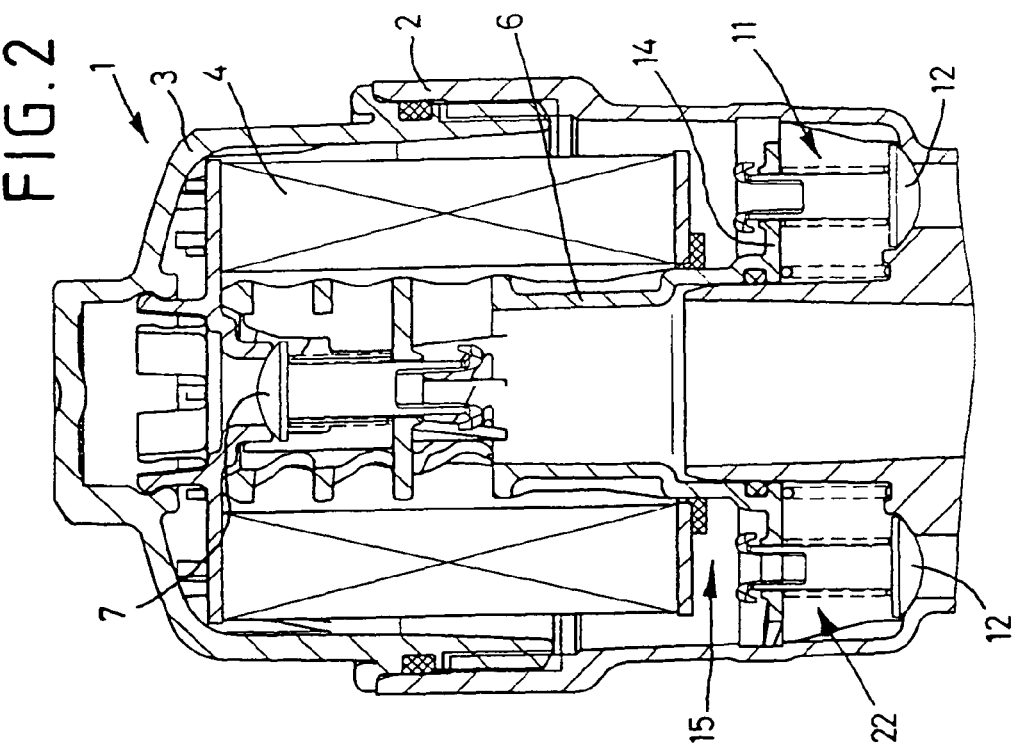

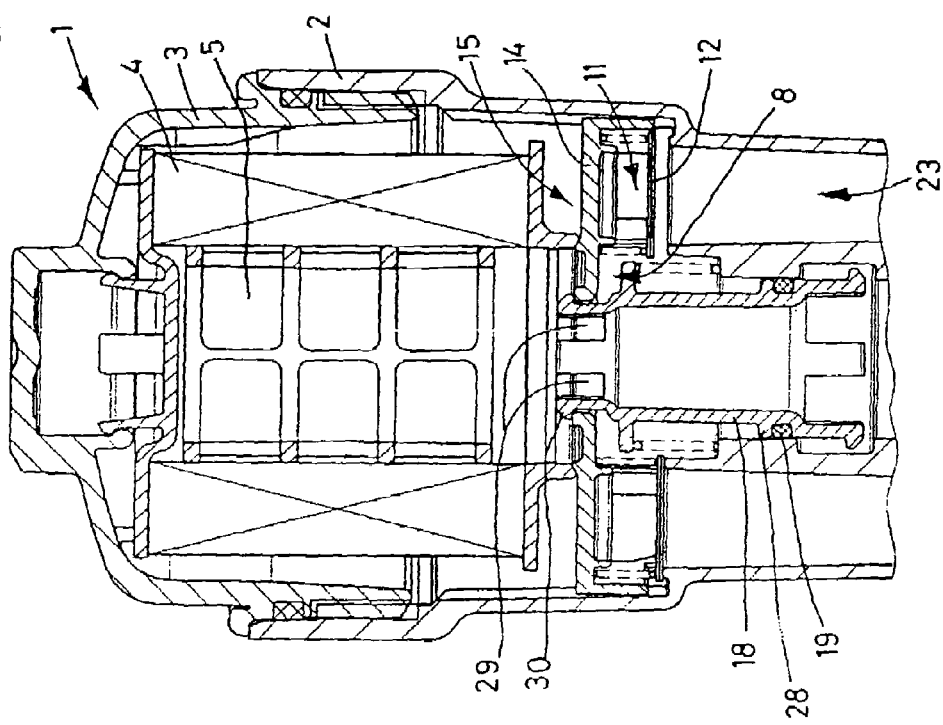
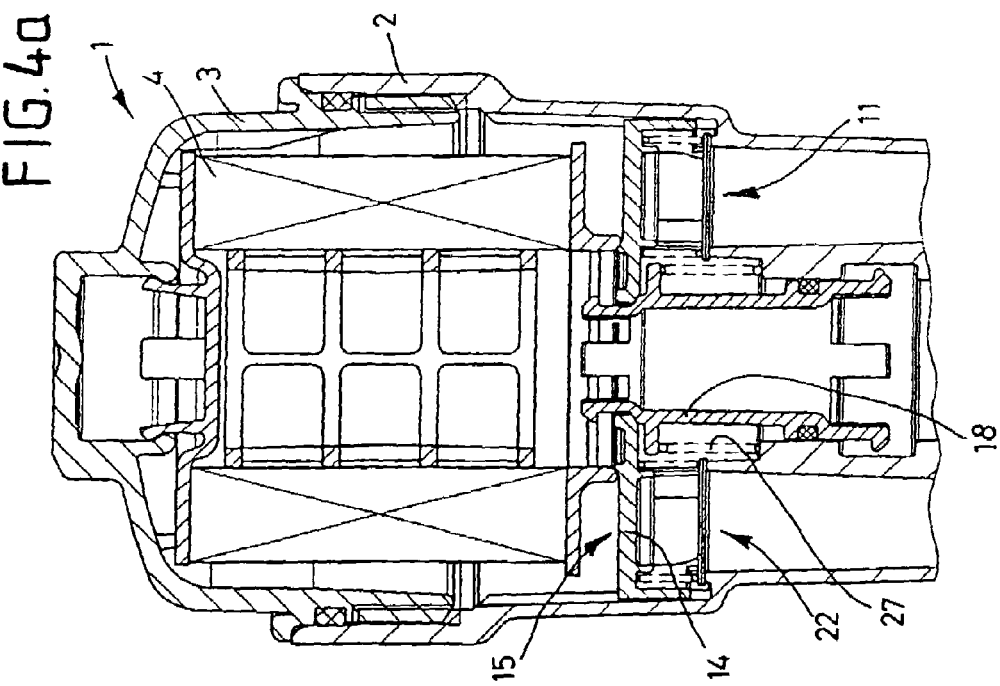

FILTER WITH A VALVE COMBINATION COMPONENT

The invention relates to a filter such as an oil filter for an internal combustion engine. Such filters are familiar from DE-U-296,10,290 or from practice, for example, as oil filters for internal combustion engines in the automobile industry. The filter in DE-U-296,10,290 has a drain valve and a check valve which must be installed separately in the filter housing. A filter which was disclosed in EP-A1-692,292 has a check valve which is molded in along with a hollow mounting screw.

Here the check valve is opened by the pressure built up by the engine when the oil enters the filter. When the engine is off and the oil pressure has dropped, the check valve closes, thereby retaining a minimum quantity of oil within the filter.

A filter bypass valve may be provided, for example, to ensure a kind of short-circuit operation of the filter in the event that the filter medium is heavily contaminated or is too viscous. In this case, given a predetermined overpressure on the unfiltered-oil side of the filter, the filter bypass valve opens, thereby creating a passage to the filter outlet which is provided for the filtered oil.

In addition, a drain valve may be provided which opens in response to the motion of the cover and filter insert when the filter is opened to change the filter insert, the purpose being to allow the oil retained inside the filter housing to be drained. This feature allows for essentially contamination-free removal of the filter insert.

The goal of the invention is to improve a filter according to the species so that it can be fabricated as inexpensively as possible and, especially, to be installed very quickly.

This goal of the invention is achieved by a filter with the features of a filter housing having a valve located in the filter housing, such as a check valve. A filter bypass valve, or a drain valve, is also provided. The valve body of the bypass or drain valve is located in a combination component. The combination component has a connector for connecting at least one additional filter component, such as an additional valve or a filter insert, to the combination component.

The invention proposes, in other words, incorporating multiple valve functions supplementary to the basic valve function in one combination component, for example, multiple valve functions. This approach, which uses prefabricated modules, enables quick installation of the filter. Specifically, when parts of the filter such as the filter base are provided on the engine housing in integrally-cast, single-piece form, the assembly or completion for final fabrication of the filter is performed in the automobile plant. In place of fully automated fabrication of a complete filter by the filter manufacturer, production is partially transferred to the automobile manufacturer—with the result that considerable simplification of the assembly process, and thus a more cost-effective production process, may be achieved by the reduction in the number of components to be assembled.

In addition to the normally provided first valve, for example the check valve, the combination component may have either the bypass valve or the drain valve, or both if required, such that complete valves may be provided which each have the movable valve body as well as the sealing surface designated as the valve seat associated with the valve body.

An alternative approach may be to wait until final assembly of the filter to create a functional filter. This approach permits especially simple pre-assembly of the combination component since said component accommodates the valve bodies in such a way that they do not yet rest on the valve seats and are thus very easily accessible and may therefore accordingly be simply and quickly installed. The associated valve seats may, on the other hand, be formed, for example, by the filter housing or filter base, or by the filter insert.

As an alternative to an arrangement with one or more additional valves, the combination component may be connected or connectable to other components of the filter to enable rapid assembly through highly integrated modules. For example, the combination component may be connected to a filter insert or to a conventional support dome for the filter insert. The filter insert must often, depending on filter type, be installed in the automobile plant in any event so that the now possible simultaneous installation of one or multiple valves enables steps in the work process to be eliminated.

In the case of a component connected to the filter insert subject to regular replacement, the filter insert may advantageously be connected in a detachable manner to the combination component, for example, through a weakly retaining clip or snap-on connection, so that both may be installed together as a single module. The combination component may, however, then remain in the filter as a filter-fixed permanent component, in an environmentally benign and economical manner, to be readily detached from the filter insert when the filter insert is changed.

The following discussion uses the drawings to explain embodiments of the invention relating to filter types having a decentralized oil drain.

Figure 1A:
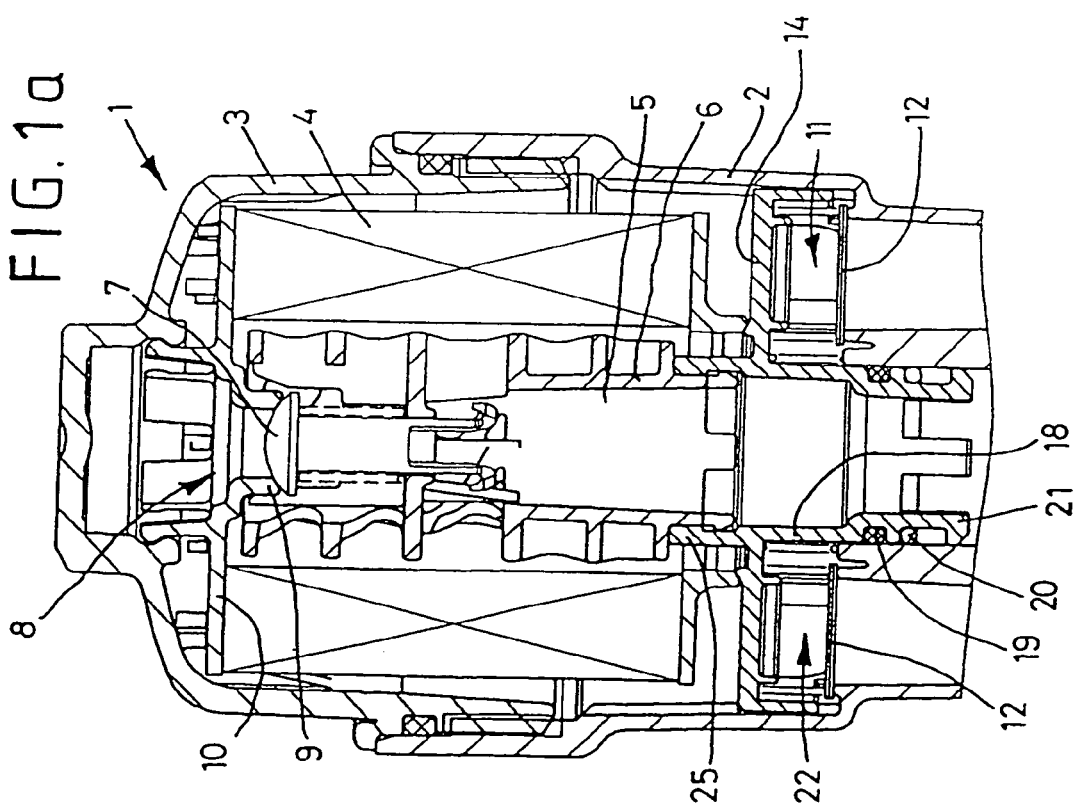

FIGS. 1a–1d show a first embodiment, with FIGS. 1a–1c showing the entire filter at various stages of operation and FIG. 1d showing the combination component alone.

FIGS. 2 and 3 each show another embodiment.

FIGS. 4a–4b show another embodiment, also at various stages of operation.

FIG. 1a shows a filter 1, an oil filter for an internal combustion engine, at the stage with the engine turned off. Filter 1 has a filter housing 2 and a cover 3, as well as a replaceable filter insert 4. Filter insert 4 encloses an internal cavity 5 in which a support dome 6 is located to prevent collapse of the filter material of filter insert 4 under the pressure and temperature conditions prevailing in the oil filter.

Support dome 6 holds a valve body 7 of a filter bypass valve 8. When the pressure outside filter insert 4 is high, valve body 7 is pressed downward, thereby opening a flow passage between valve body 7 and its associated valve seat which is formed by a collar 9 which is in turn formed by an upper end plate 10 of filter insert 4.

Additional valves of filter 1 are provided in the form of two essentially identically shaped valves which each have a valve body 12 in the form of a lamella and which function as check valve 11 and drain valve 22. Valve bodies 12 are each supported by a compression spring against base plate 14 of a combination component 15, the details of which are shown in FIG. 1d:

Holders 16 for check valve 11 and drain valve 22 are provided on base plate 14, against which holders valve bodies 12 are pressed by springs 17. This feature ensures that valve bodies 12 are permanently held in combination component 15 so that combination component 15 is pre-assembled and ready for shipping and assembly of combination component 15 is facilitated upon insertion into filter housing 2.

In addition, combination component 15 has a tubular sleeve 18. Tubular sleeve 18 supports a seal 19 made, for example, of an elastomer, and a retaining ring 20 made, for example, of metal which is located in an undercut of elastic retaining claws 21. Due to its expansion force, retaining ring 20 is able hold tubular sleeve 18 within the filter base without any undercuts being necessary, with the result that expensive further working of the filter base to accommodate retaining claws 21 is not required.

FIG. 1b shows the normal operating configuration for filter 1. Here, valve 12 of check valve 11 has been lifted by oil which has entered filter 1 through an inlet 23. Filtered oil passes through outlet 31 to the lubricating points. Drain valve 22, on the other hand, is closed since its valve body 12 rests on the associated valve seat formed by filter housing 2 preventing any oil from passing from the filter interior above combination component 15 into drain passage 32.

FIG. 1c shows the operating configuration during the "filter change" in which only filter insert 4 is changed, not the complete filter 1. It is evident here that cover 3 has been lifted from filter housing 2.

Tubular sleeve 18 of combination component 15 is clipped on to support dome 6, support dome 6 extending, by means of several retaining claws 24, behind a collar 25 provided on tubular sleeve 18. Tubular sleeve 18, and therefore the entire combination component 15, is thus lifted along with cover 3 relative to filter housing 2, for example by a clamping fit of filter insert 4 on support dome 6 due to the sealing interconnection of these components, or by the action of a spring 27.

Retaining ring 20 limits the upward travel of combination component 15, either by its clamping action alone or with the aid of a circumferential groove which is provided in filter housing 2 and which secures a fixed-height position of retaining ring 20 in filter housing 2. As FIG. 1c shows, in this raised position of combination component 15, valve body 12 of drain valve 22 has been lifted off its associated valve seat, allowing residual oil to enter drain passage 26 from internal cavity 5, and from entire filter housing 2. The thread length between cover 3 and filter housing 2 here allows for complete drainage of this residual oil such that, when filter insert 4 is removed from filter housing 2, the residual oil has dripped off filter insert 4 leaving essentially no residue.

FIG. 2 shows a second embodiment in which check valve 11 and drain valve 22 have, unlike the first embodiment, different valve bodies 12, these valve bodies 12 being of similar or identical design to valve body 7 of the filter bypass valve. In this embodiment, combination component 15 forms both base plate 14 and support dome 6, so that, with the installation simply of this one module, namely, that of combination component 15, all valve functions are installed in filter 1. The especially simple fabrication and installation of combination component 15 is also facilitated in this embodiment by the fact that the valve seats associated with valve bodies 7 or 12 are not provided in this combination component 15 but are provided in the housing or in filter insert 4.

The embodiment in FIG. 3 shows a combination component 15 of similar design to the embodiment in FIG. 2, however, one which, like the embodiment in FIG. 1 is fabricated separately from support dome 6 and is subsequently simply connected to support dome 6 in the manner familiar from FIG. 1. This embodiment has the especially cost-effective feature of being adaptable to filters of different dimensions by using different support domes 6. In an especially simple manner, the use of filter inserts 4 of differing heights allows for adaptation to the filter surface specifically required, while always permitting the use of identical filter housings 2, meaning that only covers 3 must be of different heights.

FIGS. 4a and 4b show an embodiment in which tubular sleeve 18 is designed as a separate component of combination component 15, this design allowing for simple adaptation to the specific outlet of different filter types using a standardized base plate 14. This tubular sleeve 18 of FIGS. 4a and 4b is not held by a retaining ring 18 in filter housing 2. In addition, tubular sleeve 18 also forms, in this embodiment, the movable valve body of the filter bypass valve which is provided, in this embodiment, below filter insert 4.

FIG. 4a shows filter 1 in the operating configuration with the engine off. Both check valve 11 and drain valve 22 are closed. Tubular sleeve 18 is pressed by the action of spring 27 against base plate 14 of combination component 15.

FIG. 4b, on the other hand, shows the operational configuration in which the engine is running and a specific oil pressure has built up. For example, during a cold start the oil pressure may reach a level due to the high oil viscosity at which the filter bypass valve opens. First the oil passes through inlet 23 to valve body 12 of check valve 11 and opens this valve. The oil continues to flow and disperses in the internal cavity of filter housing 2 around filter insert 4. Due to its high viscosity, the oil does not flow quickly enough into internal cavity 5—with the result that an overpressure develops outside filter insert 4 within filter 1, which pressure ultimately presses on a flange plate 28 of tubular sleeve 18 so that tubular sleeve 18 is pressed downward against the action of spring 27. Multiple windows 29 are provided between retaining claws 30 by which tubular sleeve 18 is connected to base plate 14. The oil now passes through these windows directly into outlet 31 which is intended for the filtered oil. In this embodiment, filter bypass valve 8 is thus formed by tubular sleeve 18 and base plate 14 so that, in this embodiment as well, all valve functions are carried out in combination component 15.

The embodiments presented relate exclusively to filter types in which the drain is located decentrally in the manner of drain passage 32, i.e., running radially outside the outlet, for example, axially parallel. Other known filters exist which have a so-called central drain. Here the oil first flows through a separate flow channel provided within the outlet opening which runs, for example, coaxially around the actual outlet channel separated by a partition, and which then branches off from the outlet. Filters of this type with a central outlet may also be advantageously designed according to the invention.

The invention claimed is:

1. A filter, comprising:
a filter housing having a filter base;
a filter insert located in the filter housing;
a valve located in the filter housing, the valve having a valve body and a valve seat, wherein the valve seat is formed by the filter base;
a combination component removably positioned within said housing between the filter insert and the filter base;
a support dome positioned internally of and supporting the filter insert; and
a filter bypass valve disposed within the filter support dome for enabling bypass of the filter;
wherein the valve body is located within the combination component, and the combination component has a connector connecting at least one additional filter component to the combination component, wherein the at least one additional filter component comprises the support dome.

2. The filter according to claim 1, wherein the combination component has a base plate on which the valve body is elastically supported by a spring, the valve seat associated with the valve body being disposed separately from the combination component.

3. The filter according to claim 2, wherein the base plate has an opening to which a tubular sleeve is connected, which tubular sleeve forms the valve body for one of a drain valve and the filter bypass valve.

4. The filter according to claim 3, wherein the tubular sleeve is designed as a component which is separate from the base plate.

5. The filter according to claim 1, wherein the combination component has a connector to which the filter insert is detachably attached or attachable.

* * * * *